US012197846B2

(12) United States Patent
Agarwalla et al.

(10) Patent No.: US 12,197,846 B2
(45) Date of Patent: Jan. 14, 2025

(54) MATHEMATICAL FUNCTION DEFINED NATURAL LANGUAGE ANNOTATION

(71) Applicant: International Business Machines Corporation, Armonk, NY (US)

(72) Inventors: Lalit Agarwalla, Bangalore (IN); Gandhi Sivakumar, Bentleigh (AU); Maharaj Mukherjee, Poughkeepsie, NY (US); Rashida A. Hodge, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 16/688,084

(22) Filed: Nov. 19, 2019

(65) Prior Publication Data

US 2021/0150270 A1 May 20, 2021

(51) Int. Cl.
  *G06F 17/00* (2019.01)
  *G06F 18/21* (2023.01)
  (Continued)

(52) U.S. Cl.
  CPC ........ *G06F 40/169* (2020.01); *G06F 18/2148* (2023.01); *G06F 18/2185* (2023.01);
  (Continued)

(58) Field of Classification Search
  CPC ...... G06K 9/6257; G06K 9/6264; G06K 9/72; G06N 20/00; G06F 40/56; G06F 40/169;
  (Continued)

(56) References Cited

U.S. PATENT DOCUMENTS 7,574,409 B2    8/2009  Patinkin
7,598,942 B2   10/2009  Underkoffler et al.
    (Continued)

FOREIGN PATENT DOCUMENTS

WO    02073530 A1    9/2002
WO    03058518 A2    7/2003

OTHER PUBLICATIONS

Beltagy, Iz, Kyle Lo, and Arman Cohan. "SciBERT: A pretrained language model for scientific text." arXiv preprint arXiv:1903. 10676 (2019) (Year: 2019).*

(Continued)

*Primary Examiner* — Andrew T McIntosh
(74) *Attorney, Agent, or Firm* — Kimberly Zillig

(57) ABSTRACT

Provided is a method, a computer program product, and a system for associating mathematical functions to numerical text in a natural language sample. The method includes inputting a natural language sample from a text dataset and identifying a numerical text within the natural language sample. The method further includes displaying a mathematical function corresponding to the numerical text to be selected. The mathematical function can be selected via graphical user interface displayed on a computing device. The method also includes receiving and inserting the mathematical function as a feature into a feature vector of the natural language sample and selecting an output label for the natural language sample. The output label relates to the mathematical function selected for the numerical text. The method further includes exporting the natural language sample into a labeled dataset which can be used to train a machine learning model.

12 Claims, 6 Drawing Sheets

(51) Int. Cl.
*G06F 18/214* (2023.01)
*G06F 40/151* (2020.01)
*G06F 40/169* (2020.01)
*G06F 40/56* (2020.01)
*G06N 20/00* (2019.01)

(52) U.S. Cl.
CPC ............ *G06F 40/151* (2020.01); *G06F 40/56* (2020.01); *G06N 20/00* (2019.01)

(58) Field of Classification Search
CPC .............. G06F 40/151; G06F 18/2148; G06F 18/2185; G06F 40/279
USPC ............................................................ 704/9
See application file for complete search history.

(56) References Cited

U.S. PATENT DOCUMENTS

| | | | |
|---|---|---|---|
| 8,010,466 B2 | 8/2011 | Patinkin | |
| 8,306,818 B2 | 11/2012 | Chelba et al. | |
| 9,594,743 B2* | 3/2017 | Bunin | G06F 40/30 |
| 11,030,913 B2* | 6/2021 | Panuganty | G06F 16/9535 |
| 11,227,187 B1* | 1/2022 | Weinberger | G10L 15/19 |
| 2014/0039878 A1* | 2/2014 | Wasson | G06F 40/40 |
| | | | 704/9 |
| 2016/0162474 A1* | 6/2016 | Agarwal | G06Q 30/00 |
| | | | 704/9 |
| 2018/0219959 A1* | 8/2018 | Bugenhagen | H04M 15/846 |
| 2018/0357207 A1* | 12/2018 | Yi | G06F 40/131 |
| 2019/0155904 A1 | 5/2019 | Santos Moraes et al. | |
| 2019/0259474 A1* | 8/2019 | Wang | G16C 60/00 |
| 2020/0319714 A1* | 10/2020 | Boydston | G06T 7/20 |

OTHER PUBLICATIONS

Pacheco-Venegas, Nancy D., Gilberto López, and María Andrade-Aréchiga. "Conceptualization, development and implementation of a web-based system for automatic evaluation of mathematical expressions." Computers & Education 88 (2015): 15-28 (Year: 2015).*
"Natural Language Classifier," IBM Products and Services, printed: Jul. 31, 2019, 7 pages. http://web.archive.org/web/20180306055620/ https://www.ibm.com/watson/services/natural-language-classifier/.
"Statistical classification," Wikipedia, printed: Jul. 31, 2019, 6 pages. https://en.wikipedia.org/wiki/Statistical_classification.
Wachs et al., "Vision-Based Hand-Gesture Applications," Communications of the ACM, vol. 54, No. 2, Feb. 2011, pp. 60-71.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

MATHEMATICAL FUNCTION DEFINED NATURAL LANGUAGE ANNOTATION

BACKGROUND

The present disclosure relates to natural language annotation, and more specifically, to a natural language annotator enabled by mathematical functions.

Natural language processing involves the process of configuring computers to process and analyze natural language data. Within the field of natural language processing, several categories such as speech recognition, natural language understanding, natural language generation, text analyzation, and document classification exist. Machine learning, an area of artificial intelligence, can be used in natural language processing to assist in these types of categories.

Machine learning is concerned with the development of algorithms that can be trained to improve their performance. Machine learning models can be implemented to discover patterns and inferences within natural language that can be used to assist a computer in processing the natural language. To do so, the natural language data is tagged with relevant labels through a process known as annotation. The labeled data can then be used to train a machine learning model to produce a desired result.

SUMMARY

Embodiments of the present disclosure include a computer implemented method for associating mathematical functions to numerical text in a natural language sample. The computer implemented method includes inputting a natural language sample from a text dataset and identifying a numerical text within the natural language sample. The computer implemented method further includes selecting a mathematical function corresponding to the numerical text. The mathematical function can be selected via graphical user interface displayed on a computing device. The computer implemented method also includes inserting the mathematical function as a feature into a feature vector of the natural language sample and selecting an output label for the natural language sample. The output label relates to the mathematical function selected for the numerical text. The computer implemented method further includes exporting the natural language sample into a labeled dataset which can be used to train a machine learning model.

Further embodiments are directed to a computer program product for associating mathematical functions to numerical text in a natural language sample, which can include a computer readable storage medium having program instruction embodied therewith, the program instruction executable by a processor to cause the processor to perform a method. The method includes inputting a natural language sample from a text dataset and identifying a numerical text within the natural language sample. The method further includes selecting a mathematical function corresponding to the numerical text. The mathematical function can be selected via graphical user interface displayed on a computing device. The method also includes inserting the mathematical function as a feature into a feature vector of the natural language sample and selecting an output label for the natural language sample. The output label relates to the mathematical function selected for the numerical text. The method further includes exporting the natural language sample into a labeled dataset which can be used to train a machine learning model.

Additional embodiments are directed to a mathematical natural language annotation system for associating mathematical functions to numerical text in a natural language sample, including at least one processor and at least one memory component. The system also includes a mathematical library configured to store mathematical functions relating to numerical text found in natural language samples and a mathematical aggregator configured to combine selected mathematical functions that correspond to the numerical text. The system further includes a natural language classifier configured to be trained with a labeled dataset which includes samples containing selected mathematical functions as features and a feedback component configured to receive feedback relating to an output produced by the natural language classifier.

BRIEF DESCRIPTION OF THE DRAWINGS

These and other features, aspects, and advantages of the embodiments of the disclosure will become better understood with regard to the following description, appended claims, and accompanying drawings where:

Figure 1:
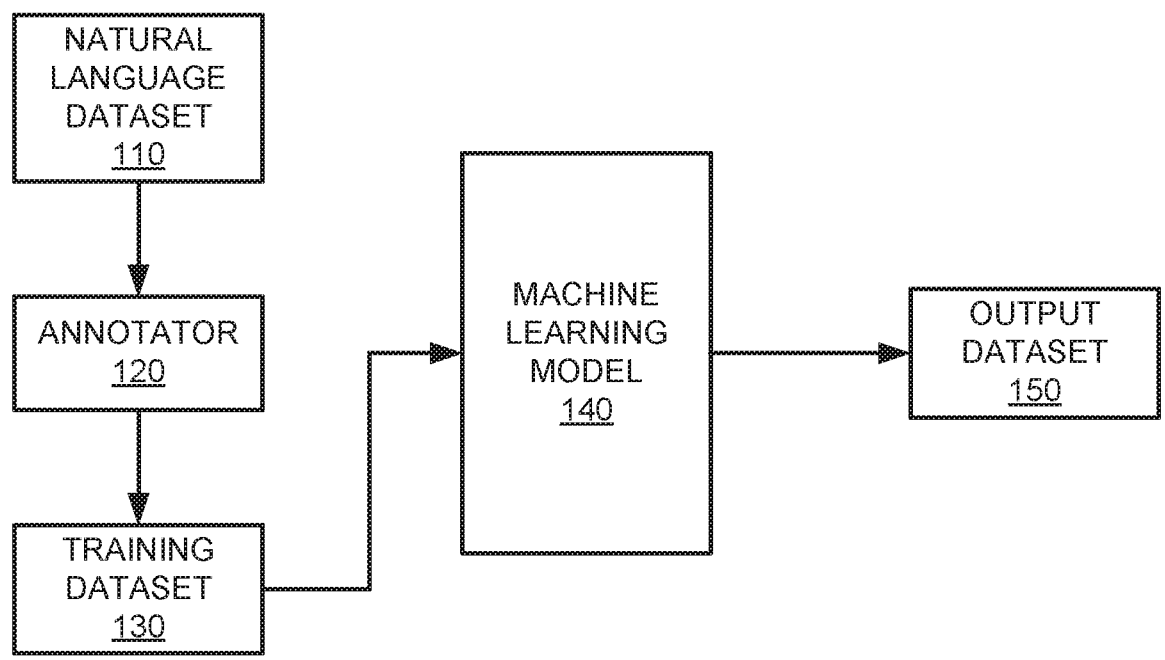
FIG. 1 is a block diagram illustrating a machine learning system, in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to natural language annotation, and more specifically, to a natural language annotator enabled by mathematical functions. While the present disclosure is not necessarily limited to such applications, various aspects of the disclosure may be appreciated through a discussion of various examples using this context.

Human language technologies attempt to capture the computational properties of linguistic structures. Capturing these computational properties can be viewed as a machine learning task which can input linguistic data to produce a desired output. The data must first be prepared in such a way as to allow a machine learning model to find patterns and inferences within the data. Annotators can provide relevant labels and features to a dataset that can assist a machine learning model during the training process. Annotation can be described as providing a label, or features, to a sample within a dataset. In order for algorithms used by a machine learning model to learn efficiently and effectively, the annotations must be accurate and relevant to the task assigned to the machine learning model.

In the field of natural language processing, machine learning models can be implemented to assist applications and computers to process and analyze large amount of natural language data. Natural language processing includes areas such as question answering systems, summarization, machine translation, speech recognition, document classification, and the like. In document classification, for instance, the task of a machine learning model is to identify in which category a document, or fields within a document, should be placed. For example, document classification includes areas involving spam filtering, news article classification, book genre classification, and the like.

Annotation can refer to labeling entire documents such as review classification for movie reviews or a genre identification for a book. However, annotation can also refer to labels that are applied to specific areas of text within a document, rather than the entire document. This type of annotation can include annotation such as part-of-speech tagging, Named Entity (NE) recognition, event identification, and the like. Annotation can also take the form of stand-off annotation or inline annotation. Stand-off annotation refers to labels that are kept separate from the text. Inline annotation refers to annotations that intermingle labels within the text.

There also several approaches to annotating the syntax of natural language. These approaches include part of speech (POS) tagging, phrase structure, dependency structure, speech synthesis, and the like. In POS tagging, a right lexical class marker is assigned to all the words in a sentence or dataset. Once tagged, the sentence can be parsed in order to make larger syntactic units. Also, in syntactic bracketing, specific sequences of words can also have labels associated with them. The labeling of words and sequences can be used in a syntactic analysis during machine translation of the words.

Limitation on accuracy remain, however, in natural language annotation. For example, existing annotation techniques lack adequate annotation tools for numerical text located within documentation. For instance, numerical text defined as a varying function are not used in training a machine learning model. Currently, numerical text and mathematical statements are annotated by automatically fitting the data into functions using classification algorithms. However, automatic fitting produces poor results in instances where numerical statements appear proximately together or are dispersed within a document.

Embodiments of the present disclosure may overcome the above, and other problems, by using a mathematical natural language annotation system. The mathematical natural language annotation system is configured to input a sample within a dataset and identify numerical text within that sample. A library of predefined mathematical functions can be displayed to an annotator to allow the annotator to select at least one mathematical function from the library. The selected mathematical function can accurately correspond to the context and/or computational value of the numerical text based on the knowledge of the annotator. Additionally, if an annotator selects more than one mathematical function, the selected functions can be combined to represent the context of the numerical text. At least one label can be determined for the sample to represent a desired result for the sample.

The mathematical function can be inserted into a feature vector of the sample to assist a machine learning model during training. The sample can be exported to a training dataset once all numerical text within the sample have had mathematical functions selected. The training dataset can then be used to train a machine learning model.

More specifically, the mathematical natural language annotation system described herein associates mathematical functions to numerical text found in natural language samples. In other words, mathematical functions can be used to provide context and computational value to numerical text found in samples such as in a document. Accordingly, the mathematical functions are considered features for the sample. These mathematical function features can be used by a machine learning model when outputting a desired result. By providing mathematical functions for numerical text, the mathematical natural language annotation system described herein improves accuracy because it provides a machine learning model with more context and computational accuracy for a sample.

By way of example, a medical report contains numerical text which includes blood pressure as 110 over 80, temperature 101°, and a glucose level as 200 for a particular patient. The desired result of the annotation and machine learning training is to identify the type of observation a patient should have based, at least partially, on the medical report. As such, the medical report is labeled as "close observation". To assist a machine learning model in making a correct determination, an annotator can utilize the mathematical natural language annotation system to select an appropriate mathematical function that corresponds to the numerical text identified in the medical report. A mathematical function can provide more context and computational value to the document in regard to the numerical text found within the document. As such, the mathematical function can better assist a machine learning model in producing an accurate output.

In some embodiments, additional mathematical functions can be selected by an annotator to represent numerical text within a document or sample. The additional mathematical functions can be combined into a cohesive function to precisely represent the numerical text within the document.

Embodiments of the present disclosure include training a machine learning model using the labeled dataset of samples that include mathematical functions as features. A training dataset can be inputted into the machine learning model to test an efficiency and accuracy of the machine learning model. An outputted pseudo labeled dataset of the machine learning model can be analyzed to determine whether to adjust the mathematical function selections for the numerical text. If the accuracy of the pseudo labeled dataset is below a predetermined threshold, then the mathematical function can be adjusted to assist in achieving a better result.

Embodiments of the present disclosure also include analyzing the pseudo labeled dataset and providing feedback to a user based on the analysis conducted on the pseudo labeled dataset. Insights, such as accuracy and efficiency, can be gained by analyzing the pseudo labeled dataset and that feedback can be provided to a user to allow them to make adjustments to the mathematical natural language annotation system if needed.

In some embodiments, the mathematical function is a complex function to provide support for fractal models. Fractal models implement a fractal learning technique which can enhance machine learning techniques such as neural networks. A fractal as referred herein is a mathematical set that can exhibit a repeating pattern, which is displayed at every scale of the fractal.

In some embodiments, the mathematical natural language annotation system provides mathematical libraries to annotators which are domain specific. For example, an annotator annotating a medical record may be offered a selection of mathematical functions which relate to the medical field. Similarly, or alternatively, an annotator annotating an engineering schematic may be offered a selection of mathematical functions which relate to the field of engineering.

Embodiments of the present disclosure include a means for associating additional text within a natural language sample with the numerical text. For instance, a medical report may have a numerical text such as the blood pressure for a patient. Proximate areas around the numerical text may provide additional context regarding whether the blood pressure is low, within normal range, or high. That additional text can be associated with the numerical text when determining the mathematical function. As such, the mathematical natural language annotation system can analyze the document, determine text that associates with the numerical, through conventional natural language processing, and provide the context to the numerical text. The context can assist an annotator in determining an appropriate mathematical function.

In some embodiments, a context relating to the mathematical function is displayed to an annotator over a graphical user interface. For example, referring back to the medical record containing a numerical text such as a blood pressure reading. A context selection can be displayed to the annotator such as low, normal, or high which they then can select to add to the numerical text. The context can be added as an additional feature by placing it into the feature vector of the sample being reviewed. Additionally, the context which is displayed to the annotator can be domain specific. For example, if an annotator is review medical documents, then context regarding medical-based text can be displayed. Alternatively, if an annotator is reviewing recipe measurements, then cooking based context.

FIG. 1 is a block diagram illustrating a machine learning system 100, in accordance with embodiments of the present disclosure. The machine learning system 100 includes natural language dataset 110, an annotator 120, a training dataset 130, a machine learning model 140, and an output dataset 150.

The natural language dataset 110 is a set of data which requires annotation prior to being used as training data for the machine learning model 140. The natural language dataset 110 includes a collection of samples. Each sample can be annotated with one or more features and a label. For example, the natural language dataset 110 may include a collection of medical records, engineering schematics, employee records, and the like. Features can refer to input variables of a sample that can be used to make a prediction on a label. Additionally, features within a sample can be weighed and adjusted by the machine learning model 140 to assist in making an accurate prediction on a label. The natural language dataset 110 can include samples such as text, audio recordings, books, various types of documents, and the like.

In some embodiments, the natural language dataset 110 includes unprocessed data. For example, the natural language dataset 110 can include a collection of documents which have not had any pre-processing performed on the documents. Pre-processing includes techniques that apply structure to at least a part of the data for further analysis. Pre-processing can include, without limitation, determining a word or phrase count, determining special characters, relative length of text, and topic identification.

Samples within the natural language dataset 110 can include data which is quantitative and data which is also qualitative. For example, numerical text can be quantitative data which can be described using numbers and mathematical procedures. Additional text within the document can be qualitative which can be described using numbers and basic mathematics. Qualitative data can be thought of as being described using natural categories and language.

The annotator 120 is a component of the machine learning system configured to provide annotations and labels to the samples within the natural language dataset 110. The annotator 120 can provide annotation and pre-processing to the samples. Annotating can include grammar analyzation as well as an analyzation on how language is embedded in human activity. The grammar analyzation can include areas such as syntax, semantic morphology, phonology, and lexicon. Language embedded in human activity can include areas such as discourse, pragmatics, and text theory.

Analyzing syntax involves examining parts of speech and how they combine to make larger constructions. Semantics includes examining the relations between words and what the yare being used to represent. Morphology represents the study of units of meaning in a language. The units include words, affixes, and other word structures that have meaning. Phonology includes the study of the sound patterns of a particular language which includes determining which phones have significance and which have meaning.

Discourse analysis includes examining the exchange of information, and in particular, the flow of information across sentence boundaries. Pragmatics includes the study of how the context of text affects the meaning of an expression, and what information is necessary to infer a hidden or presupposed meaning. Text structure analysis examines how narratives and other textual styles are constructed to make larger textual compositions.

The training dataset 130 is a set of data used by machine learning system 100 as training data for the machine learning model 140. The training dataset 130 includes a collection of samples with each sample containing one or more features and a label. In some embodiments, the training dataset 130 is divided into a training set, a validation set, and a test set. The validation set can be a subset of the training dataset 130 for use in validating a pseudo labeled dataset produced by the machine learning model 140. The test set can also be a subset of the training dataset 130 used to test the machine learning model 140 after training and validation.

The machine learning model 140 is a component of the machine learning system 100 configured to learn from training data and assign labels to unlabeled datasets once trained. The machine learning model 140 is further configured to adjust parameters and weights of features during the training cycle. The machine learning model 140 can perform predictive analyses, spam detection, pattern detection, image classification, other types of categorical classifications, as well as logistic regressions. The machine learning model 140 can employ different algorithmic methods and techniques to map and label the inputted data. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can implement techniques such as K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, and binary classifier.

In some embodiments, the machine learning model 140 implements deep learning techniques based on artificial neural networks. Deep learning techniques include deep neural networks, deep belief networks, recurrent neural networks, and convolutional neural networks. Deep learning applies techniques which implement multiple layers to progressively extract higher level features from the input.

The machine learning model 140 is further configured to provide a logistic regression type model. This model type can generate a prediction probability for each label predicted. For example, if the machine learning model 140 predicts an email as spam, that prediction is accompanied with a prediction probability, or confidence level, the machine learning model 140 has in providing that prediction. The prediction probability can be a percentage ranging from 0 to 100% depending on the confidence of the machine learning model 140. It should be noted that other forms of prediction probability can also show the confidence level of a predicted label. As the machine learning model 140 is trained, its prediction probabilities can also increase.

The output dataset 150 set of data generated by machine learning system 100 containing labels produced by the machine learning model 140. The output dataset 130 includes a collection of samples with each sample containing one or more features and a label. For example, the output dataset 150 can include labeled samples which are being tested by the machine learning system 100 to determine the accuracy and efficiency of the machine learning model 140.

It is noted that FIG. 1 is intended to depict the representative major components of an exemplary machine learning system 100. In some embodiments, however, individual components may have greater or lesser complexity than as represented in FIG. 1, components other than or in addition to those shown in FIG. 1 may be present, and the number, type, and configuration of such components may vary.

Figure 2:
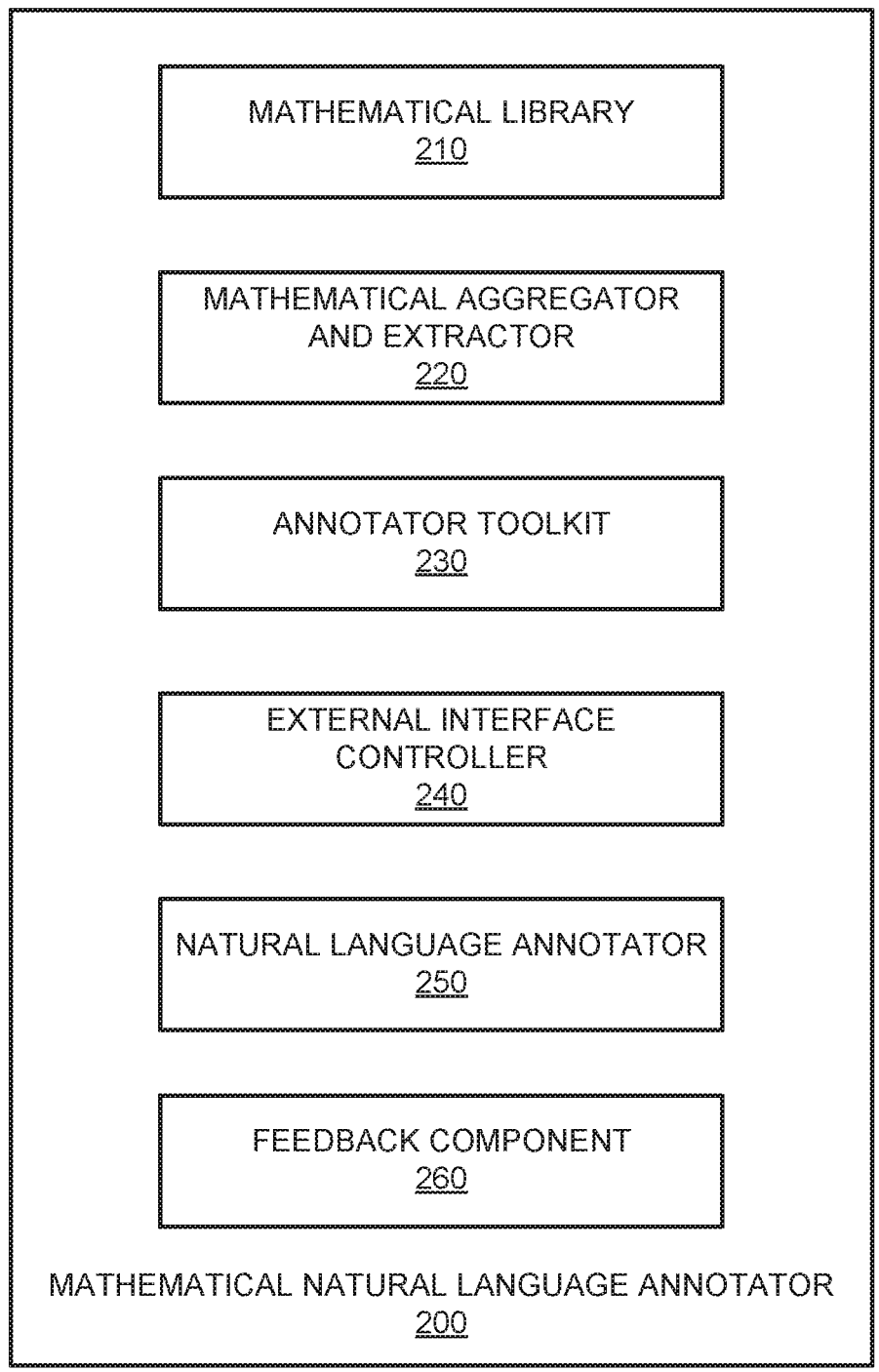
FIG. 2 is a block diagram illustrating a mathematical natural language annotator, in accordance with embodiments of the present disclosure.

FIG. 2 is a block diagram illustrating a mathematical natural language annotator 200 for associating mathematical functions to numerical text in a natural language sample, in accordance with embodiments of the present disclosure. The mathematical natural language annotator 200 (e.g., which may be the same as, or substantially similar to, the annotator 120 of FIG. 1) includes a mathematical library 210, a mathematical aggregator and extractor 220, an annotation toolkit 230, an external interface controller 240, a natural language classifier 250, and a feedback component 260.

The mathematical library 210 is a component of the mathematical natural language annotator 200 configured to provide a library of mathematical functions available to an annotator to select from. In some embodiments, the library provided to the annotator is domain specific. In some embodiments, the mathematical functions are parsed by areas such as basic symbols, logarithms, exponents, set theory, calculus, linear algebra, and the like. In some embodiments, the mathematical library 210 divides the mathematical functions by domains. These domains can include areas such as engineering, medicine, natural sciences, physics, biology, and the like.

The mathematical aggregator and extractor 220 is a component of the mathematical natural language annotator 200 configured to combine and aggregate mathematical functions. The data points required for the mathematical functions can be extracted from the input text. Combining the mathematical functions can use techniques such as addition, subtraction, multiplication, and division. Also, a graphical analysis can be performed to derive a unique function based on the graphs of each function overlaying each other. Other techniques include, without limitation, horizontal shifts, vertical shifts, horizontal dilation, and vertical dilation can be implemented to combine mathematical functions.

The annotation toolkit 230 is a component of the mathematical natural language annotator 200 configured to provide a user interface to an annotator selecting the mathematical functions. The annotation toolkit 230 includes a set of basic building units used to generate a user interface. The annotation toolkit 230 can implement known toolkits such as the abstract window toolkit, fox toolkit, OpenGL utility toolkit (GLUT), Motif, synthesis toolkit, and the like.

The external interface controller 240 is a component of the mathematical natural language annotator 200 configured to provide integration of the mathematical language annotator 200 with external interfaces. The external interface controller 240 is configured to receive and transmit queues, partition into multiple logical interfaces, and process network traffic. The external interface controller 240 allows the mathematical natural language annotator 200 to communicate over a computer network, either by using cables or wirelessly. The external interface controller 240 provides physical access to a networking medium and other similar networks, and it also provides a low-level addressing system, such as MAC addresses, uniquely assigned to network interfaces.

The natural language classifier 250 (e.g., which may be the same as, or substantially similar to, the machine learning model 140 of FIG. 1) is a component of the mathematical natural language annotator 200 configured to input mathematical functions with training data to generate a desired output relating to the data. The natural language classifier 250 is further configured to be trained with supervised learning techniques to make predictions and to input unlabeled data to generate conclusions based on the inputted data. The natural language classifier 250 can be implement a methodology for analyzing samples based on mathematical functions that represent numerical text found within the samples. Some samples may contain multiple portions containing numerical text. Accordingly, in some embodiments, the natural language classifier 250 is trained to analyze multiple mathematical functions as features within a feature vector. These features can be weighed by the natural language classifier 250 during the training process.

The feedback component 260 is a component of the mathematical natural language annotator 200 configured to collect feedback from annotators to be used for improvement of the mathematical natural language annotator 200. Direct feedback can be collected directly from an individual utilizing the mathematical natural language annotator 200 or it can be received through the external interface controller 240.

Figure 3:
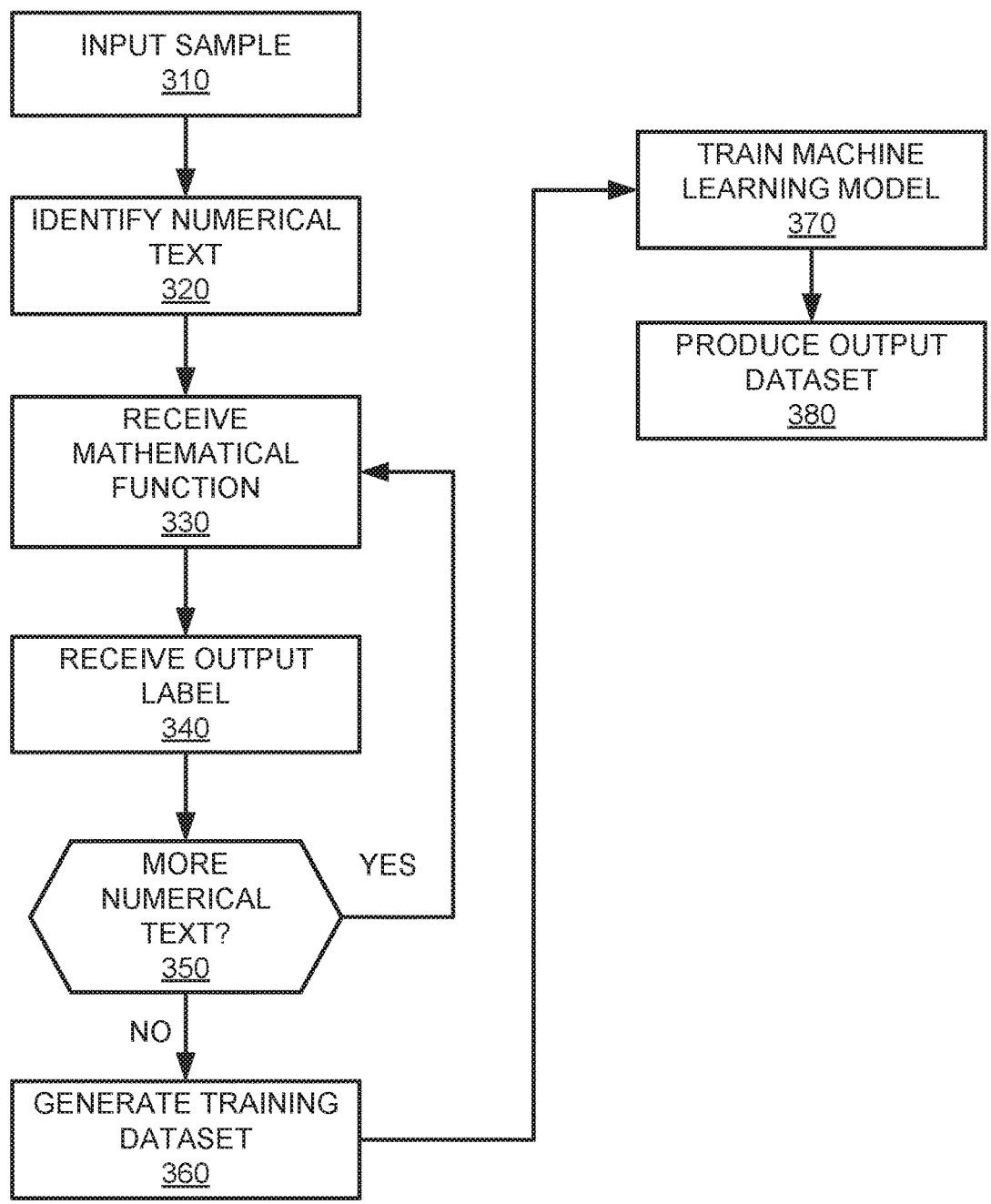
FIG. 3 is a flow chart of a machine learning training process, in accordance with embodiments of the present disclosure.

FIG. 3 is a flow diagram illustrating a process 300 for associating mathematical function to numerical text in a natural language sample, in accordance with embodiments of the present disclosure. For example, the mathematical natural language annotator 200 described above with reference to FIG. 2. The process 300 may be performed by hardware, firmware, software executing on at least one processor, or any combination thereof. For example, any or all of the steps of the process 300 may be performed by one or computing devices.

The process 300 begins by inputting a sample for annotation into the mathematical natural language annotator 200. This is illustrated at step 310. A sample can be included within the natural language dataset 110. The sample can be items such as a document, an area of text, speech, database field, and the like. The sample can be parsed to identify a numerical text, or grouping of numerical text, within the sample using various annotation and natural language processing techniques. This is illustrated at step 320. For example, a medical record can include various numerical text such as weight, height, age, and various physical condition readings for a patient. The numerical text identified can be parsed separately or can be grouped together depending on the information provided within the sample.

Once divided, a mathematical library 210 can provide mathematical functions relevant to the numerical text for selection. The mathematical functions can be displayed on a graphical user interface of a computing device. An annotator can select which mathematical function, or functions, best represent and convey the context of the numerical text. Once selected, the mathematical natural language annotator 200 can receive the selections as input. This is illustrated at step 330. For example, if the numerical text is a tensile strength for a particular material, the annotator can provide a mathematical function which correspond to a tensile strength analysis. In some embodiments, a collection of numerical text proximate to each other can be used together when selecting a mathematical function. The collection of numerical text may provide more insight as to the values provided. For example, a patient may have multiple readings listed on a medical record such as heart rate, blood pressure, temperature, and the like. A combination of those readings may be used to select a mathematical function that utilizes those value to predict an illness. The annotator can select an appropriate function based on the numerical text.

The mathematical natural language annotator 200 can further provide output labels for the sample being annotated. The output labels can be displayed on a graphical user interface of a computer device. An annotator selects the output label for the sample based on the selected mathematical function. Once selected, the mathematical natural language annotator 200 can receive the output label as input. This is illustrated at step 340. The output label is the desired result a machine learning model 140 should produce based on the features and mathematical functions of the sample. For example, a patient exhibiting certain characteristics such as high blood pressure, increased temperature, with a low blood sugar reading, may have an output label relating to the level of observation the patient should have while in the hospital.

The process 300 repeats steps 330 and 340 for each numerical text identified in the sample. This is illustrated at step 350. Once all numerical text have been assigned a mathematical function, the sample can be exported to generate a training dataset 130. This is illustrated at step 360.

The training dataset 130 can then be used to train the machine learning model 140. This is illustrated at step 370. Training can implement techniques such as supervised learning and semi-supervised learning. Supervised learning generates a function mapping from inputs to a fixed set of labels. The labels being the output labels provided by the annotator at step 340. Semi-supervised learning generates a function mapping from inputs of both labeled and unlabeled data. Features, in addition to the mathematical functions, assist the machine learning model 140 in learning an approximate target function by mapping the inputted features to the desired output.

Additional feature selections can be made prior to, or during the mathematical function selection to assist in the training process. For example, feature selection techniques such as N-Gram features, structure dependent features, and annotation-dependent features can be used to generate features for the samples used in training.

In some embodiments, the training dataset 130 is divided into a training set, a validation set, and a test set. The training dataset 130 can be randomly divided into three equal size groups to form the training set, validation set, and test set. The training set can be used to initially train the machine learning model 140 to label images. The validation set can be used during a process used, as part of training, to evaluate the quality of the output from the machine learning model 140. Validation can ensure that the performance of the model generalizes beyond the training dataset 130. The test set can be used during a process of testing the machine learning model 140 after the machine learning model 140 has been initially vetted by the validation set. Once trained, the machine learning model 140 can produce an output dataset 150. This is illustrated at step 380.

Figure 4:
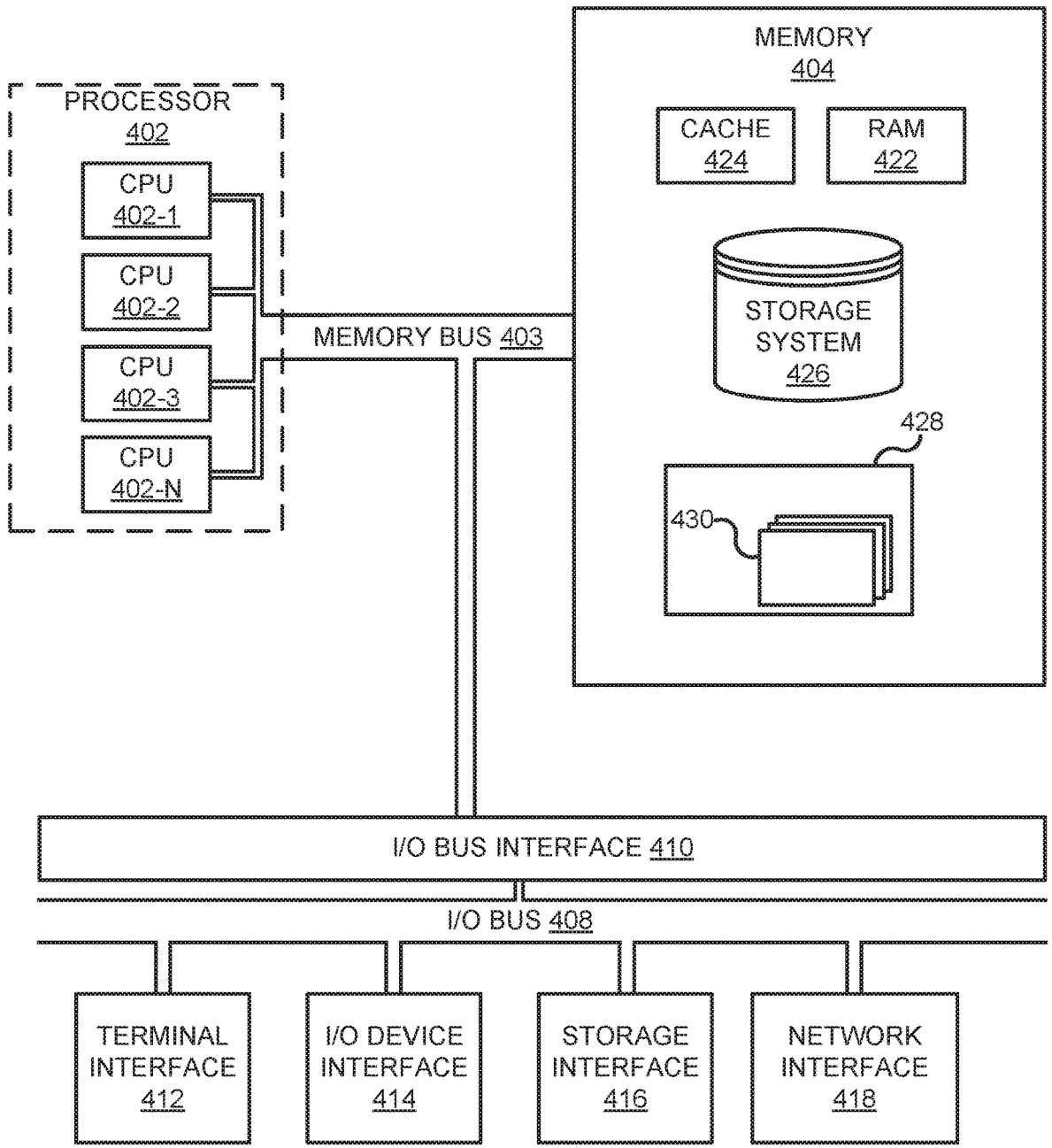
FIG. 4 is a high-level block diagram illustrating an example computer system that may be used in implementing one or more of the methods, tools, and modules, and any related functions, described herein, in accordance with embodiments of the present disclosure.

Referring now to FIG. 4, shown is a high-level block diagram of an example computer system 400 (e.g., the machine training system 100, mathematical natural language annotator 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, a I/O (Input/Output) device interface 414, a storage interface 416, and a network interface 418, all of which may be communicatively coupled, directly or indirectly, for inter-component communication via a memory bus 403, a I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments the computer system 400 may alternatively be a single CPU system. Each processor 401 may execute instructions stored in the memory 404 and may include one or more levels of on-board cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
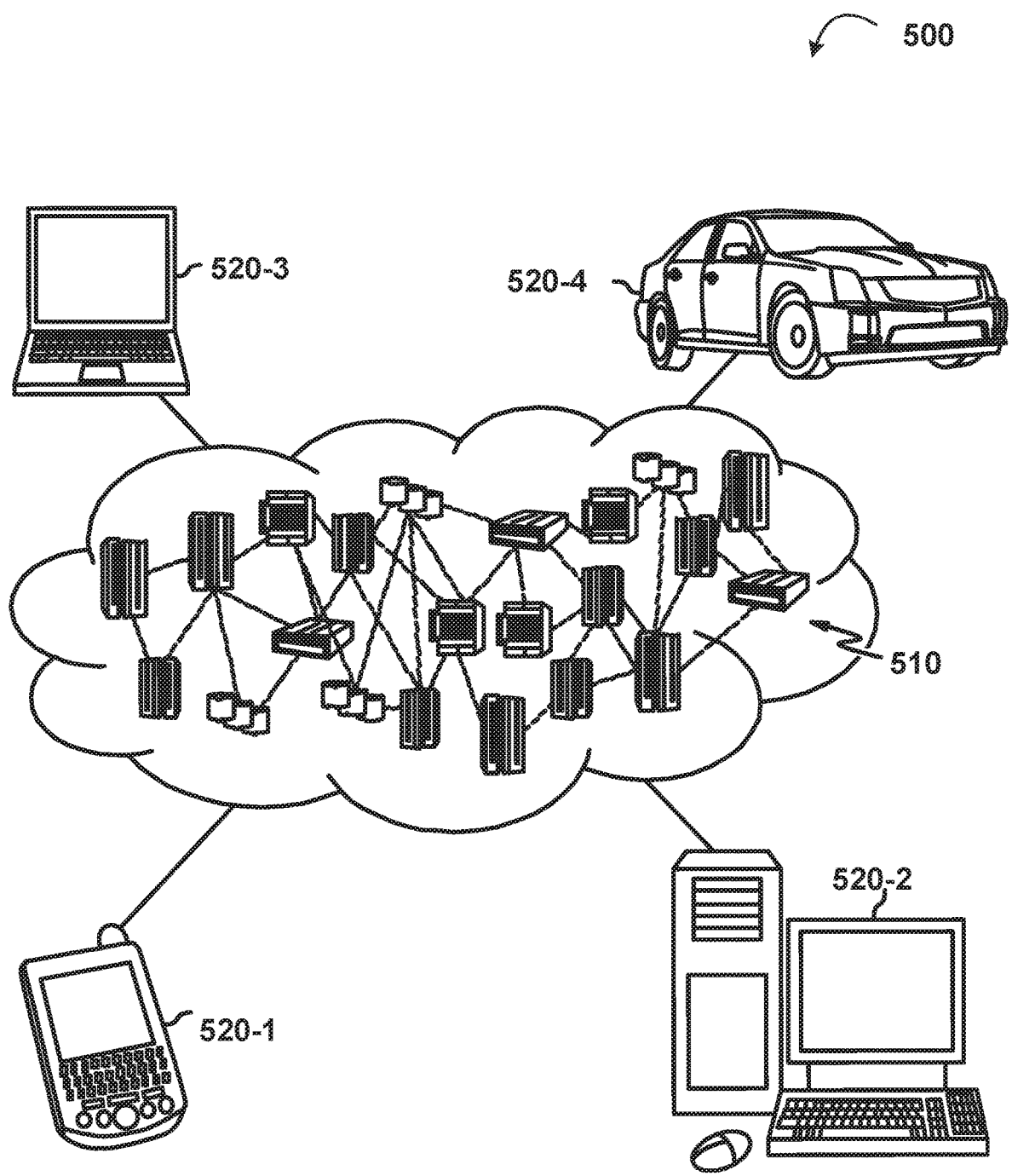
FIG. 5 depicts a cloud computing environment, in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
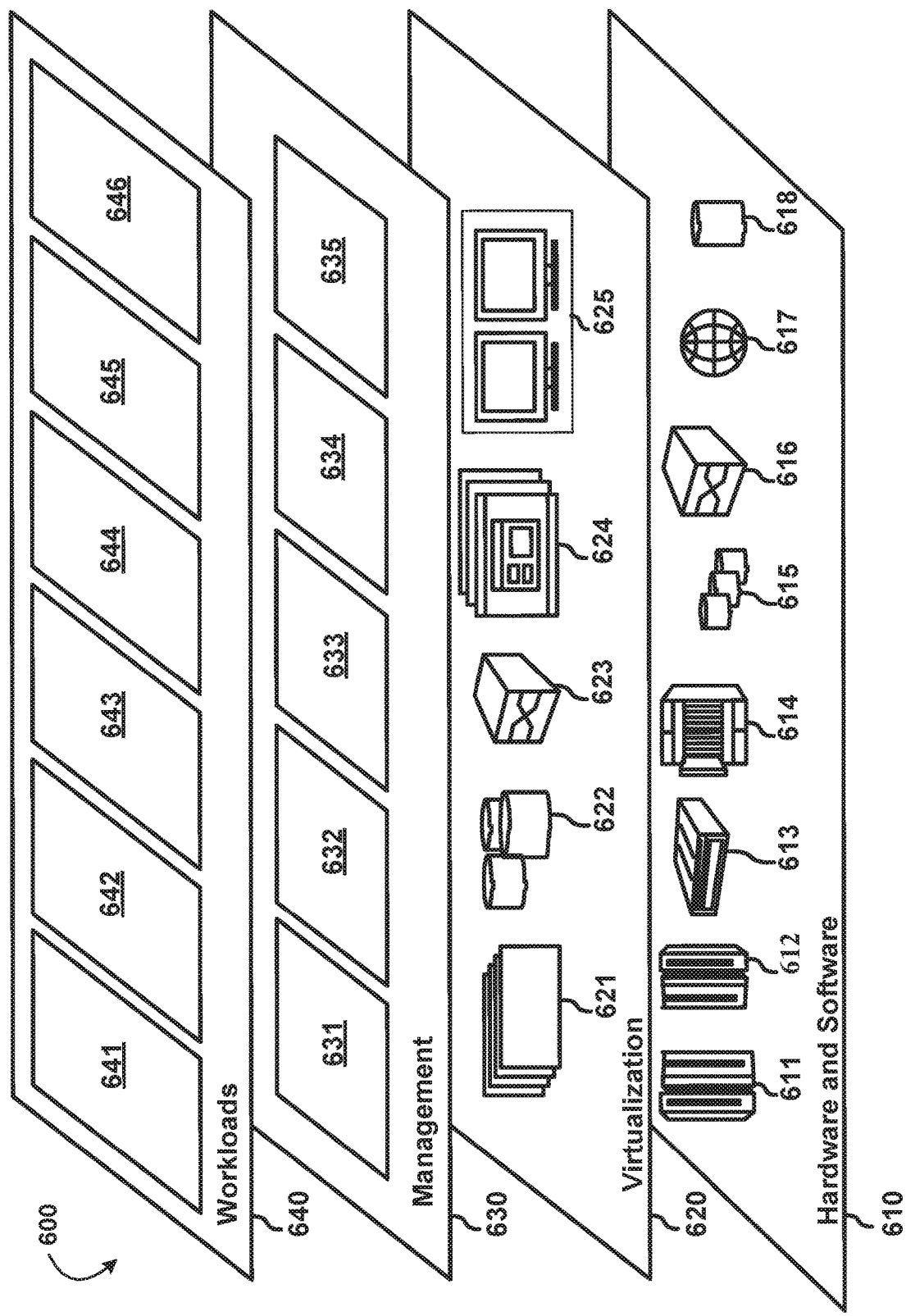
FIG. 6 depicts abstraction model layers, in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include: mapping and navigation 641; software development and lifecycle management 642; virtual classroom education delivery 643; data analytics processing 644; transaction processing 645; and natural language annotation 646 (e.g., mathematical natural language annotator 200).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   inputting a natural language sample from a text dataset;
   identifying a numerical text in the natural language sample;
   selecting mathematical functions relevant to the numerical text from a mathematical library, wherein the mathematical library divides the mathematical functions by domains;
   displaying, via a graphical user interface on a computing device, the mathematical functions and output labels corresponding to computational values relating to the numerical text and displaying a context relating to the numerical text, wherein the context is specific to one domain of the domains of the mathematical functions;
   receiving at least one selected mathematical function chosen from the mathematical functions displayed, wherein the selected mathematical function is a complex function for fractal models;
   inserting the selected mathematical function and the context as features into a feature vector of the natural language sample;
   receiving a selected output label for the natural language sample based on the selected mathematical function and chosen from the output labels displayed;
   labelling the natural language sample with the selected output label;
   exporting the natural language sample into a labeled dataset;
   training a machine learning model with the labeled dataset;
   inputting a training dataset into the machine learning model to test an efficiency and an accuracy of the machine learning model, wherein the training dataset is divided into a training set adapted to train the machine learning model, a validation set adapted to evaluate a quality of output from the machine learning model, and a test set adapted to test the machine learning model after being evaluated by the validation set;

outputting, by the machine learning model, a pseudo labeled dataset;
adjusting the selected mathematical function based, at least partially, on the accuracy of the pseudo labeled dataset;
analyzing the pseudo labeled dataset; and
providing feedback of the accuracy of the machine learning model to a user in order to allow the user to make adjustments to the machine learning model.

2. The computer implemented method of claim 1, wherein the selected mathematical function is a combined mathematical function from a plurality of selected mathematical functions.

3. The computer implemented method of claim 1, further comprising:
associating, prior to inserting the mathematical function, additional text within the natural language sample with the numerical text; and
providing context to the numerical text based on the additional text.

4. The computer implemented method of claim 1, further comprising:
displaying, via the graphical user interface, a list of contexts relating to the mathematical function;
receiving a selected context from the list of contexts; and
inserting the selected context as an additional feature into the feature vector of the natural language sample.

5. A computer program product comprising:
one or more computer-readable storage media;
program instructions, stored on at least one of the one or more storage media, to input a natural language sample from a text dataset;
program instructions, stored on at least one of the one or more storage media, to identify a numerical text in the natural language sample;
program instructions, stored on at least one of the one or more storage media, to select mathematical functions relevant to the numerical text from a mathematical library, wherein the mathematical library divides the mathematical functions by domains;
program instructions, stored on at least one of the one or more storage media, to display, via a graphical user interface on a computing device, mathematical functions and output labels corresponding to computational values relating to the numerical text and display a context relating to the numerical text, wherein the context is specific to one domain of the domains of the mathematical functions;
program instructions, stored on at least one of the one or more storage media, to receive at least one selected mathematical function chosen from the mathematical functions displayed, wherein the selected mathematical function is a complex function for fractal models;
program instructions, stored on at least one of the one or more storage media, to insert the selected mathematical function and the context as features into a feature vector of the natural language sample;
program instructions, stored on at least one of the one or more storage media, to receive a selected output label for the natural language sample based on the selected mathematical function and chosen from the output labels displayed;
program instructions, stored on at least one of the one or more storage media, to label the natural language sample with the selected output label;
program instructions, stored on at least one of the one or more storage media, to export the natural language sample into a labeled dataset;
program instructions, stored on at least one of the one or more storage media, to train a machine learning model with the labeled dataset;
program instructions, stored on at least one of the one or more storage media, to input a training dataset into the machine learning model to test an efficiency and an accuracy of the machine learning model, wherein the training dataset is divided into a training set adapted to train the machine learning model, a validation set adapted to evaluate a quality of output from the machine learning model, and a test set adapted to test the machine learning model after being evaluated by the validation set;
program instructions, stored on at least one of the one or more storage media, to output, by the machine learning model, a pseudo labeled dataset;
program instructions, stored on at least one of the one or more storage media, to adjust the selected mathematical function based, at least partially, on the accuracy of the pseudo labeled dataset;
program instructions, stored on at least one of the one or more storage media, to analyze the pseudo labeled dataset; and
program instructions, stored on at least one of the one or more storage media, to provide feedback of the accuracy of the machine learning model to a user in order to allow the user to make adjustments to the machine learning model.

6. The computer program product of claim 5, wherein the selected mathematical function is a combined mathematical function from a plurality of selected mathematical functions.

7. The computer program product of claim 5, further comprising:
program instructions, stored on at least one of the one or more storage media, to associate, prior to inserting the mathematical function, additional text within the natural language sample with the numerical text; and
program instructions, stored on at least one of the one or more storage media, to provide context to the numerical text based on the additional text.

8. The computer program product of claim 5, further comprising:
program instructions, stored on at least one of the one or more storage media, to display, via the graphical user interface, a list of contexts relating to the mathematical function;
program instructions, stored on at least one of the one or more storage media, to receive a selected context from the list of contexts; and
program instructions, stored on at least one of the one or more storage media, to insert the selected context as an additional feature into the feature vector of the natural language sample.

9. A computer system for mathematical natural language annotation, the computer system comprising:
one or more processors, one or more computer-readable memories and one or more computer-readable storage media;
program instructions, stored on at least one of the one or more storage media for execution by at least one of the one or more processors via at least one of the one or more memories, to store mathematical functions having computational values relating to numerical text found in natural language samples, wherein the mathematical functions are divided by domains and wherein the computational values provide context to the numerical text;

program instructions, stored on at least one of the one or more storage media for execution by at least one of the one or more processors via at least one of the one or more memories, to combine selected mathematical functions that correspond to the numerical text, wherein the selected mathematical functions are complex functions for fractal models;

program instructions, stored on at least one of the one or more storage media for execution by at least one of the one or more processors via at least one of the one or more memories, to provide a context relating to each of the mathematical functions, wherein the context is specific to one domain of the domains of the mathematical functions;

program instructions, stored on at least one of the one or more storage media for execution by at least one of the one or more processors via at least one of the one or more memories, to train a machine learning model with a labeled dataset which includes the natural language samples containing selected mathematical functions and the context relating to each of the mathematical functions as features in a feature vector of each of the natural language samples to output a pseudo labeled dataset, wherein the machine learning model is configured to be tested for efficiency and accuracy by inputting a training dataset into the machine learning model, wherein the training dataset is divided into a training set adapted to train the machine learning model, a validation set adapted to evaluate a quality of output from the machine learning model, and a test set adapted to test the machine learning model after being evaluated by the validation set;

program instructions, stored on at least one of the one or more storage media for execution by at least one of the one or more processors via at least one of the one or more memories, to receive feedback relating to the output;

program instructions, stored on at least one of the one or more storage media for execution by at least one of the one or more processors via at least one of the one or more memories, to analyze the pseudo labeled dataset; and program instructions, stored on at least one of the one or more storage media for execution by at least one of the one or more processors via at least one of the one or more memories, to provide feedback of the accuracy of the machine learning model to a user in order to allow the user to make adjustments to the machine learning model.

10. The computer system of claim 9, further comprising:
program instructions, stored on at least one of the one or more storage media for execution by at least one of the one or more processors via at least one of the one or more memories, to combine a plurality of mathematical functions to represent the numerical text.

11. The computer system of claim 9, further comprising:
program instructions, stored on at least one of the one or more storage media for execution by at least one of the one or more processors via at least one of the one or more memories, to output a result based, at least partially, on the mathematical functions.

12. The computer system of claim 9, further comprising:
program instructions, stored on at least one of the one or more storage media for execution by at least one of the one or more processors via at least one of the one or more memories, to identify additional text from the natural language sample which provide the context for the numerical text.

\* \* \* \* \*